(12) United States Patent
Opferman et al.

(10) Patent No.: US 11,314,763 B2
(45) Date of Patent: Apr. 26, 2022

(54) OFF-CHAIN FUNCTIONALITY FOR DATA CONTAINED IN BLOCKS OF BLOCKCHAIN

(71) Applicant: CenturyLink Intellectual Property LLC, Broomfield, CO (US)

(72) Inventors: Stephen Opferman, Denver, CO (US); William R. Benassi, Elk River, MN (US); James P. Gately, Boulder, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 199 days.

(21) Appl. No.: 16/798,861

(22) Filed: Feb. 24, 2020

(65) Prior Publication Data

US 2020/0311094 A1    Oct. 1, 2020

Related U.S. Application Data

(60) Provisional application No. 62/823,778, filed on Mar. 26, 2019.

(51) Int. Cl.
| | | |
|---|---|---|
| *G06F 17/00* | (2019.01) | |
| *G06F 16/25* | (2019.01) | |
| *G06F 16/23* | (2019.01) | |
| *H04L 9/32* | (2006.01) | |

(52) U.S. Cl.
CPC ........ *G06F 16/254* (2019.01); *G06F 16/2365* (2019.01); *H04L 9/3239* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 10,917,234 B2* | 2/2021 | Mehedy | G06F 16/1837 |
| 2017/0103167 A1* | 4/2017 | Shah | G06F 40/40 |
| 2017/0344435 A1* | 11/2017 | Davis | G06F 16/2365 |
| 2018/0173719 A1* | 6/2018 | Bastide | G06F 16/176 |
| 2018/0240165 A1* | 8/2018 | Kilpatrick | G06Q 30/04 |
| 2019/0013934 A1* | 1/2019 | Mercuri | G06Q 20/3827 |
| 2019/0342084 A1* | 11/2019 | Mehedy | H04L 9/0643 |
| 2020/0028688 A1* | 1/2020 | Takada | H04L 63/12 |
| 2020/0074464 A1* | 3/2020 | Trevethan | H04L 9/0637 |
| 2020/0235911 A1* | 7/2020 | Safak | H04L 9/3073 |

* cited by examiner

*Primary Examiner* — Hung D Le

(57) ABSTRACT

Novel tools and techniques are provided for implementing off-chain functionality for data contained in blocks of blockchain. In various embodiments, a computing system might assemble data extracted from each block of a first block(s) of a first instance of a blockchain in a generated first file(s), the assembled data being organized to mirror how the data is organized and stored in the first block(s); might store, in a secure database, the first file(s), the first file(s) being configured to be content-searchable, content-sortable, and/or content-filterable; might generate a second instance of the blockchain, which contains one or more second blocks, the one or more second blocks each containing the hash value of each corresponding first block(s), without containing the data contained in each block of the first block(s); and might store, in a distributed peer data storage system of the blockchain system, the generated second instance of the blockchain.

18 Claims, 8 Drawing Sheets

US 11,314,763 B2

OFF-CHAIN FUNCTIONALITY FOR DATA CONTAINED IN BLOCKS OF BLOCKCHAIN

CROSS-REFERENCES TO RELATED APPLICATIONS

This application claims priority to U.S. patent application Ser. No. 62/823,778 (the "'778 Application"), filed Mar. 26, 2019 by Stephen Opferman et al., entitled, "Method and System for Implementing Off-Chain Functionality for Data Contained in Blocks of Blockchain," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing blockchain functionality, and, more particularly, to methods, systems, and apparatuses for implementing off-chain functionality for data contained in blocks of blockchain.

BACKGROUND

In conventional blockchain systems, data stored in blocks of blockchains are not easily content-searchable, at least without processing such data. Sorting and filtering of such data in the blocks of blockchains are likewise difficult without processing such data.

Moreover, coordinating with and/or maintaining hundreds of partner organizations' versions of blockchain code and the tech stack underneath it (like a consortium would) can be very time-consuming from a coordination perspective and can be expensive to implement.

Hence, there is a need for more robust and scalable solutions for implementing blockchain functionality, and, more particularly, to methods, systems, and apparatuses for implementing off-chain functionality for data contained in blocks of blockchain.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
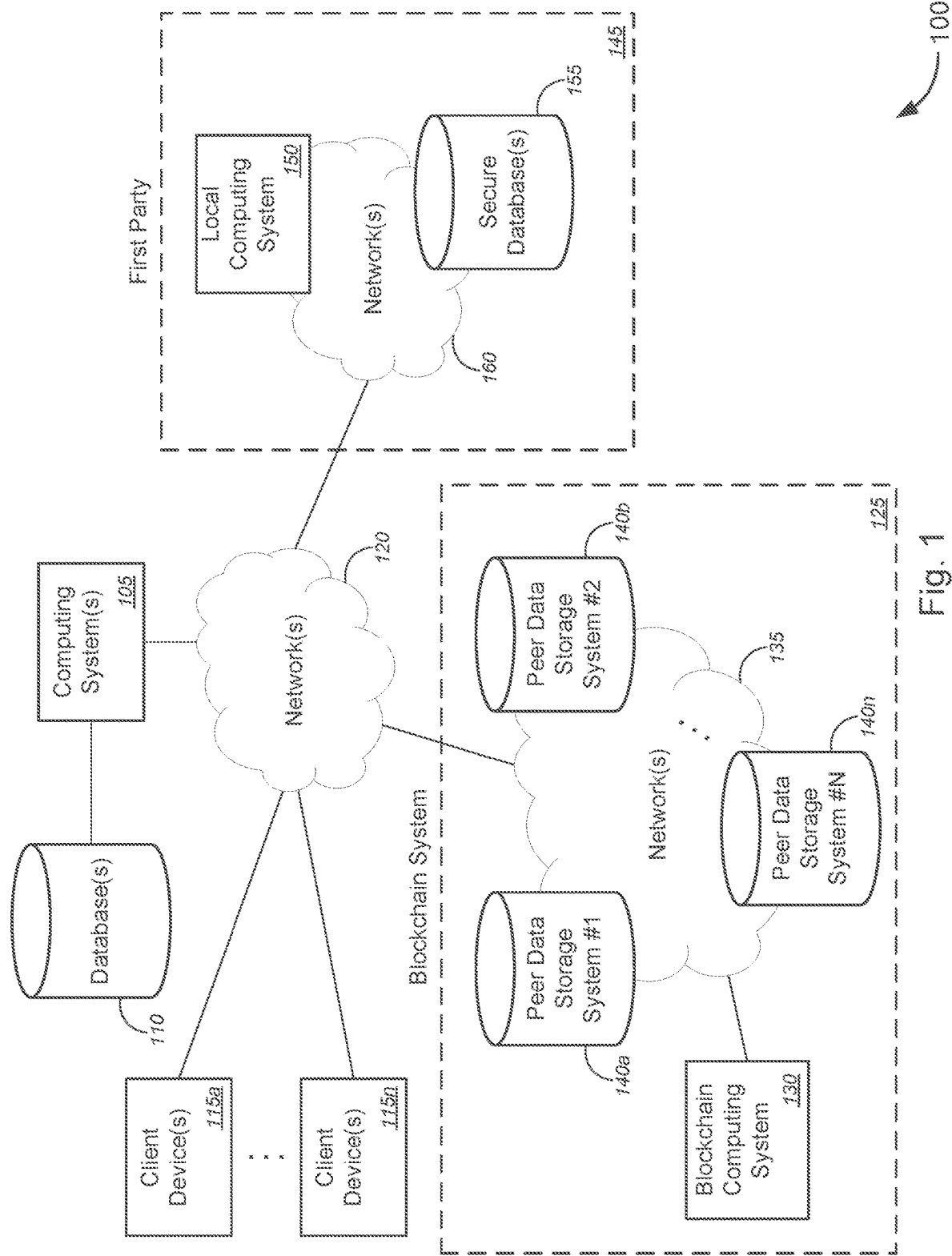
FIG. 1 is a schematic diagram illustrating a system for implementing off-chain functionality for data contained in blocks of blockchain, in accordance with various embodiments.

Various embodiments provide tools and techniques for implementing blockchain functionality, and, more particularly, to methods, systems, and apparatuses for implementing off-chain functionality for data contained in blocks of blockchain.

In various embodiments, a computing system(s) might receive (e.g., from a blockchain system, or a peer data storage system, or the like) a first instance of a blockchain among a plurality of instances of a blockchain of the blockchain system; might extract, from the first instance of the blockchain, one or more first blocks of the blockchain; might extract, from the one or more first blocks of the blockchain, data contained in each block of the one or more first blocks of the blockchain and a hash value of each corresponding first block; and might generate one or more first files. The computing system(s) might assemble the data contained in each block of the one or more first blocks in the generated one or more first files, wherein the assembled data is organized to mirror how the data is organized and stored in the one or more first blocks; might store, in a secure database, the one or more first files (as shown, e.g., in FIG. 2, or the like), wherein the one or more first files are configured to be content-searchable; might generate a second instance of the blockchain, the second instance of the blockchain containing one or more second blocks, wherein the one or more second blocks each contains the hash value of each corresponding one or more first blocks, without containing the data contained in each block of the one or more first blocks (as shown, e.g., in FIG. 2, or the like); and might store, in a distributed peer data storage system of the blockchain system, the generated second instance of the blockchain.

In some embodiments, the hash value of each corresponding first block might be produced using a cryptographic hash function including, but not limited to, one of secure hash algorithm-1 ("SHA-1") standard, SHA-2 standard, or SHA-3 standard, and/or the like. In some cases, the one or more first files might comprise one or more data management system files that enable database search functionality including, without limitation, at least one of content search functionality, content sorting functionality, or content filtering functionality, and/or the like.

According to some embodiments, extracting the one or more first blocks of the blockchain from the first instance of the blockchain might comprise extracting all blocks of the blockchain from the first instance of the blockchain, while extracting the data and the hash value from each block might comprise extracting data contained in each block of all the blocks of the blockchain and a hash value of each corresponding block. In some instances, receiving the first instance of the blockchain might comprise receiving, with the computing system, the first instance of the blockchain via an application programming interface ("API"). In some embodiments, at least one client device among the one or more client devices might access the one or more files stored in the secure database(s) via one or more networks, either via an API or via a virtual private network ("VPN"), or the like. Alternatively, or additionally, at least one client device among the one or more client devices might access the first instance or the second instance of the blockchain stored in the peer data storage system via the one or more networks, either via an API or via a VPN, or the like.

Merely by way of example, in some cases, the computing system might determine whether the blockchain has changed; based on a determination that the blockchain has changed, might receive a third instance of the blockchain; might determine a difference between the third instance of the blockchain and the first instance of the blockchain, the determined difference comprising one or more second data and one or more second hash values corresponding to one or more third blocks; and might update the generated one or more first files, by adding the one or more second data to the data that is assembled in one or more first files. In some instances, the computing system might generate a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and might store, in the distributed peer data storage system, the generated fourth instance of the blockchain. Alternatively, the computing system might update the generated second instance of the blockchain, by adding the one or more second hash values, without adding the one or more second data.

The various aspects address the issues of conventional blockchain systems (namely, the issues with coordinating with and/or maintaining hundreds of partner organizations' version of the blockchain code (or blockchain instance) and the tech stack underneath it (like a consortium would) being very time-consuming from a coordination perspective and being expensive to implement, or the like). In particular, in some aspects, the various embodiments might address these issues by implementing off-chain functionality for data contained in blocks of blockchains that enables users to easily search, sort, or filter data contained in blockchains, as described in detail above with respect to FIGS. 1-6.

These and other aspects of the off-chain functionality for data contained in blocks of blockchain are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, blockchain technology, data management technology, and/or the like. In other aspects, certain embodiments, can improve the functioning of user equipment or systems themselves (e.g., blockchain systems, data management systems, etc.), for example, by receiving, with a computing system, a first instance of a blockchain among a plurality of instances of the blockchain of a blockchain system; extracting, with the computing system and from the first instance of the blockchain, one or more first blocks of the blockchain from the first instance of the blockchain; extracting, with the computing system and from the one or more first blocks of the blockchain, data contained in each block of the one or more first blocks of the blockchain and a hash value of each corresponding first block; generating, with the computing system, one or more first files; assembling, with the computing system, the data contained in each block of the one or more first blocks in the generated one or more first files, wherein the assembled data is organized to mirror how the data is organized and stored in the one or more first blocks; storing, with the computing system and in a secure database, the one or more first files, wherein the one or more first files are configured to be content-searchable; generating, with the computing system, a second instance of the blockchain, the second instance of the blockchain containing one or more second blocks, wherein the one or more second blocks each contains the hash value of each corresponding one or more first blocks, without containing the data contained in each block of the one or more first blocks; and storing, with the computing system and in a distributed peer data storage system of the blockchain system, the generated second instance of the blockchain; and/or the like.

In particular, to the extent any abstract concepts are present in the various embodiments, those concepts can be implemented as described herein by devices, software, systems, and methods that involve specific novel functionality (e.g., steps or operations), such as, extracting data contained in blocks of a blockchain, extracting hash values of corresponding blocks, assembling the data (and, in some cases, the hash values) in one or more generated files, where the assembled data is organized to mirror how the data is organized and stored in the blocks of the blockchain, and storing the files (which are content-searchable, content sortable, or content filterable, and/or the like) in a secure database, while generating another instance of the blockchain in which the blocks contain the hash value of each corresponding one of the blocks of the blockchain, without containing the data contained in each of these blocks, and/or the like, to name a few examples, that extend beyond mere conventional computer processing operations. These functionalities can produce tangible results outside of the implementing computer system, including, merely by way of example, providing off-chain functionality that enables users to easily search, sort, or filter data contained in blockchains, and/or the like, at least some of which may be observed or measured by customers and/or service providers.

In an aspect, a method might comprise receiving, with a computing system, a first instance of a blockchain among a plurality of instances of the blockchain of a blockchain system; extracting, with the computing system and from the first instance of the blockchain, one or more first blocks of the blockchain from the first instance of the blockchain; extracting, with the computing system and from the one or more first blocks of the blockchain, data contained in each block of the one or more first blocks of the blockchain and a hash value of each corresponding first block; and generating, with the computing system, one or more first files. The method might further comprise assembling, with the computing system, the data contained in each block of the one or more first blocks in the generated one or more first files, wherein the assembled data is organized to mirror how the data is organized and stored in the one or more first blocks; storing, with the computing system and in a secure database, the one or more first files, wherein the one or more first files are configured to be content-searchable; generating, with the computing system, a second instance of the blockchain, the second instance of the blockchain containing one or more second blocks, wherein the one or more second blocks each contains the hash value of each corresponding one or more first blocks, without containing the data contained in each block of the one or more first blocks; and storing, with the computing system and in a distributed peer data storage system of the blockchain system, the generated second instance of the blockchain.

In some embodiments, the computing system might comprise one of a data management system, a server computer, a cloud-based computing system over a network, or a distributed computing system, and/or the like. In some cases, the secure database might be associated with a first company, and the secure database might be disposed within an internal network of the first company and the secure database might be insulated from external networks via a firewall. According to some embodiments, the hash value of each corresponding first block might be produced using a cryptographic hash function comprising one of secure hash algorithm-1 ("SHA-1") standard, SHA-2 standard, or SHA-3 standard, and/or the like. In some instances, the one or more first files might comprise one or more data management system files that enable database search functionality comprising at least one of content search functionality, content sorting functionality, or content filtering functionality, and/or the like.

Merely by way of example, in some cases, extracting the one or more first blocks of the blockchain from the first instance of the blockchain might comprise extracting all blocks of the blockchain from the first instance of the blockchain, wherein extracting the data and the hash value from each block might comprise extracting data contained in each block of all the blocks of the blockchain and a hash value of each corresponding block. In some instances, receiving the first instance of the blockchain might comprise receiving, with the computing system, the first instance of the blockchain via an application programming interface ("API").

According to some embodiments, the method might further comprise determining, with the computing system, whether the blockchain has changed; based on a determination that the blockchain has changed, receiving, with the computing system, a third instance of the blockchain; and determining, with the computing system, a difference between the third instance of the blockchain and the first instance of the blockchain, the determined difference comprising one or more second data and one or more second hash values corresponding to one or more third blocks. The method might further comprise updating, with the computing system, the generated one or more first files, by adding the one or more second data to the data that is assembled in one or more first files; generating, with the computing system, a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and storing, with the computing system and in the distributed peer data storage system, the generated fourth instance of the blockchain. In some instances, generating the fourth instance of the blockchain and storing the generated fourth instance of the blockchain might comprise updating, with the computing system, the generated second instance of the blockchain, by adding the one or more second hash values, without adding the one or more second data.

In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive a first instance of a blockchain among a plurality of instances of the blockchain of a blockchain system; extract, from the first instance of the blockchain, one or more first blocks of the blockchain from the first instance of the blockchain; extract, from the one or more first blocks of the blockchain, data contained in each block of the one or more first blocks of the blockchain and a hash value of each corresponding first block; generate one or more first files; assemble the data contained in each block of the one or more first blocks in the generated one or more first files, wherein the assembled data is organized to mirror how the data is organized and stored in the one or more first blocks; store, in a secure database, the one or more first files, wherein the one or more first files are configured to be content-searchable; generate a second instance of the blockchain, the second instance of the blockchain containing one or more second blocks, wherein the one or more second blocks each contains the hash value of each corresponding one or more first blocks, without containing the data contained in each block of the one or more first blocks; and store, in a distributed peer data storage system of the blockchain system, the generated second instance of the blockchain.

In some embodiments, the computing system might comprise one of a data management system, a server computer, a cloud-based computing system over a network, or a distributed computing system, and/or the like. In some cases, the secure database might be associated with a first company, and the secure database might be disposed within an internal network of the first company and the secure database might be insulated from external networks via a firewall. According to some embodiments, the hash value of each corresponding first block might be produced using a cryptographic hash function comprising one of secure hash algorithm-1 ("SHA-1") standard, SHA-2 standard, or SHA-3 standard, and/or the like. In some instances, the one or more first files might comprise one or more data management system files that enable database search functionality comprising at least one of content search functionality, content sorting functionality, or content filtering functionality, and/or the like.

Merely by way of example, in some cases, extracting the one or more first blocks of the blockchain from the first instance of the blockchain might comprise extracting all blocks of the blockchain from the first instance of the blockchain, wherein extracting the data and the hash value from each block might comprise extracting data contained in each block of all the blocks of the blockchain and a hash value of each corresponding block. In some instances, receiving the first instance of the blockchain might comprise receiving the first instance of the blockchain via an application programming interface ("API").

According to some embodiments, the first set of instructions, when executed by the at least one first processor, might further cause the computing system to: determine whether the blockchain has changed; based on a determination that the blockchain has changed, receive a third instance of the blockchain; determine a difference between the third instance of the blockchain and the first instance of the blockchain, the determined difference comprising one or more second data and one or more second hash values corresponding to one or more third blocks; update the generated one or more first files, by adding the one or more second data to the data that is assembled in one or more first files; generate a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and store, in the distributed peer data storage system, the generated fourth instance of the blockchain. In some instances, generating the fourth instance of the blockchain and storing the generated fourth instance of the blockchain might comprise updating the generated second instance of the blockchain, by adding the one or more second hash values, without adding the one or more second data.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing blockchain functionality, and, more particularly, to methods, systems, and apparatuses for implementing off-chain functionality for data contained in blocks of blockchain, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing off-chain functionality for data contained in blocks of blockchain, in accordance with various embodiments.

In the non-limiting embodiment of FIG. 1, system 100 might comprise computing system(s) 105 and corresponding database(s) 110. In some embodiments, the computing system(s) 105 might include, without limitation, one of a data management system, a server computer, a cloud-based computing system over a network, or a distributed computing system, and/or the like. System 100 might further comprise one or more client devices 115a-115n (collectively, "client devices 115" or the like), one or more networks 120, and a blockchain system 125. In some cases, the one or more client devices 115 might each include, but is not limited to, one of a laptop computer, a desktop computer, a tablet computer, a television set, a smart television, a media player, a gaming console, a set-top box ("STB"), a digital video recording ("DVR") device, a smart phone, a mobile phone, or a personal digital assistant, and/or the like. According to some embodiments, system 100 might further comprise a first party (which might include, without limitation, a private company, a public company, an entity, a customer, a user, or the like). The network(s) 120 might communicatively couple together the computing system(s) 105, the client device(s) 115, the blockchain system 125, and the first party 145.

In some embodiments, the blockchain system 125 might comprise a blockchain computing system 130, one or more networks 135, and peer data storage systems #1 through #N 140a-140n (collectively, "peer data storage systems 140," "distributed peer data storage systems 140," or the like), the blockchain computing system 130 and the peer data storage systems 140 being communicatively coupled to each other via network(s) 135. Each instance of a blockchain containing a plurality of blocks might be stored in two or more of the plurality of peer data storage systems 140a-140n. A non-limiting example of an instance of a blockchain (which might include hash values and such, not shown) can be seen in the embodiment of FIG. 2, which is described below. According to some embodiments, data of a block and hash value of a previous block in the blockchain might be encrypted to produce a hash value, using a cryptographic hash function including, without limitation, one of secure hash algorithm-1 ("SHA-1") standard (e.g., a 160-bit hash function, or the like), SHA-2 standard (e.g., SHA-256, SHA-512, SHA-224, SHA-384, SHA-512/224, SHA 512/

256, and/or the like), or SHA-3 standard (having same hash lengths as SHA-2 but differing in internal structure compared with the rest of the SHA family of standards), and/or the like.

Merely by way of example, in some cases, the first party 145 might comprise a local computing system 150, one or more secure databases 155, and network(s) 160. The local computing system 150, like the computing system(s) 105, might include, without limitation, one of a data management system, a server computer, a cloud-based computing system over a network, or a distributed computing system, and/or the like. In some instances, the secure database(s) 155 might be disposed within an internal network (e.g., network(s) 160, or the like) of the first party 145 and the secure database(s) 155 might be insulated from external networks (e.g., network(s) 120 or the like) via a firewall, or the like.

According to some embodiments, the network(s) 120, 135, and/or 160 might each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network(s) 120, 135, and/or 160 might include an access network of the service provider (e.g., an Internet service provider ("ISP")). In another embodiment, the network(s) 120, 135, and/or 160 might include a core network of the service provider, and/or the Internet.

In operation, the computing system(s) 105 (and/or the local computing system 150, or the like) might receive (e.g., from blockchain system 125, or one or more of the peer data storage systems 140, or the like) a first instance of a blockchain among a plurality of instances of the blockchain of blockchain system 125; might extract, from the first instance of the blockchain, one or more first blocks of the blockchain from the first instance of the blockchain; might extract, from the one or more first blocks of the blockchain, data contained in each block of the one or more first blocks of the blockchain and a hash value of each corresponding first block; and might generate one or more first files. The computing system(s) 105 (and/or the local computing system 150, or the like) might assemble the data contained in each block of the one or more first blocks in the generated one or more first files, wherein the assembled data is organized to mirror how the data is organized and stored in the one or more first blocks; might store, in a secure database (e.g., secure database(s) 155, or the like), the one or more first files (as shown, e.g., in FIG. 2, or the like), wherein the one or more first files are configured to be content-searchable; might generate a second instance of the blockchain, the second instance of the blockchain containing one or more second blocks, wherein the one or more second blocks each contains the hash value of each corresponding one or more first blocks, without containing the data contained in each block of the one or more first blocks (as shown, e.g., in FIG. 2, or the like); and might store, in a distributed peer data storage system (e.g., peer data storage system 140, or the like) of the blockchain system 125, the generated second instance of the blockchain.

In some embodiments, the hash value of each corresponding first block might be produced using a cryptographic hash function including, but not limited to, one of secure hash algorithm-1 ("SHA-1") standard, SHA-2 standard, or SHA-3 standard, and/or the like. In some cases, the one or more first files might comprise one or more data management system files that enable database search functionality including, without limitation, at least one of content search functionality, content sorting functionality, or content filtering functionality, and/or the like.

According to some embodiments, extracting the one or more first blocks of the blockchain from the first instance of the blockchain might comprise extracting all blocks of the blockchain from the first instance of the blockchain, while extracting the data and the hash value from each block might comprise extracting data contained in each block of all the blocks of the blockchain and a hash value of each corresponding block. In some instances, receiving the first instance of the blockchain might comprise receiving, with the computing system, the first instance of the blockchain via an application programming interface ("API"). In some embodiments, at least one client device 115 among the one or more client devices 115a-115n might access the one or more files stored in the secure database(s) 155 via network (s) 120, either via an API or via a virtual private network ("VPN"), or the like. Alternatively, or additionally, at least one client device 115 among the one or more client devices 115a-115n might access the first instance or the second instance of the blockchain stored in the peer data storage system 140 via network(s) 120 and network(s) 135, either via an API or via a VPN, or the like.

Merely by way of example, in some cases, the computing system 105 (and/or the local computing system 150, or the like) might determine whether the blockchain has changed; based on a determination that the blockchain has changed, might receive a third instance of the blockchain; might determine a difference between the third instance of the blockchain and the first instance of the blockchain, the determined difference comprising one or more second data and one or more second hash values corresponding to one or more third blocks; and might update the generated one or more first files, by adding the one or more second data to the data that is assembled in one or more first files. In some instances, the computing system 105 (and/or the local computing system 150, or the like) might generate a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and might store, in the distributed peer data storage system, the generated fourth instance of the blockchain. Alternatively, the computing system 105 (and/or the local computing system 150, or the like) might update the generated second instance of the blockchain, by adding the one or more second hash values, without adding the one or more second data.

In convention blockchain systems, coordinating with and/or maintaining hundreds of partner organizations' version of the blockchain code (or blockchain instance) and the tech stack underneath it (like a consortium would) can be very time-consuming from a coordination perspective and can be expensive to implement. By contrast, the various embodiments described herein address these issues by implementing off-chain functionality for data contained in blocks of blockchains, as described in detail above with respect to FIG. 1. In some embodiments, throw-away containers might be provided to coordinate with and/or maintaining just the blockchain code itself. Further, in this manner, life-cycling or transacting to or from it on the blockchain might be made easier to swap out the top then maintain the stack beneath it.

In some embodiments, all organizations on a given blockchain might be restricted to having the same mutual business goal and might also be restricted to executing the same blockchain code. There are no channels and there are no other features that could be used that orient the blockchain to a singular large infrastructure. It might only grow to that set of organizations executing the same blockchain code. In some cases, for new clients, the system might build out the path to or from them and might scope out their operational environmental needs. The system might build a reusable blockchain container to that end that may be used as an organization's template. An API might be created that takes a chaincode as the argument and might deliver that organization's chain endpoint (e.g., organization, etc.) on the existing chain(s) or blockchain(s) that the organization is participating in using that template that can be spun up at a push of a button (e.g., in CLC, AWS, Azure, etc.) and can also be handed out outside of the context of cloud systems in images. According to some embodiments, the lifecycle of the blockchain might be singular in nature. Any change to the chaincode or the blockchain and the stack underneath it means invoking that same API again to generate that new chain endpoint.

These and other functionalities of the various embodiments are described in detail below with respect to FIGS. 2-4.

Figure 2:
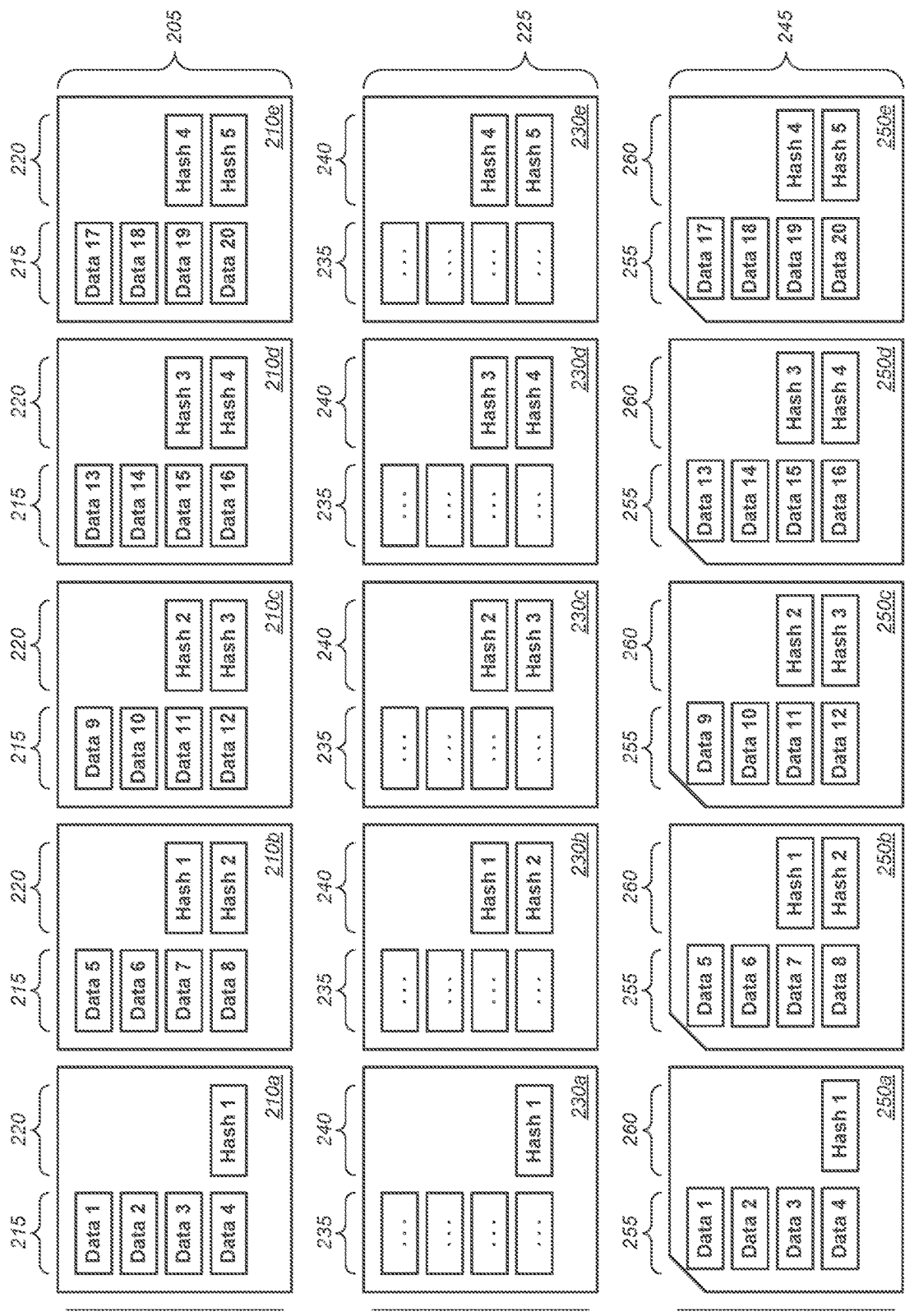
FIG. 2 is a schematic diagram illustrating an example of instances of a blockchain and off-chain files that may be used by a system that utilizes blockchains to implement off-chain functionality for data contained in blocks of blockchain, in accordance with various embodiments.

FIG. 2 is a schematic diagram illustrating an example 200 of instances of a blockchain and off-chain files that may be used by a system that utilizes blockchains to implement off-chain functionality for data contained in blocks of blockchain, in accordance with various embodiments.

With reference to FIG. 2, an example 200 of a first instance 205 of a blockchain is depicted. The first instance 205 of the blockchain might comprise a plurality of blocks 210a-210e (collectively, "blocks 210" or the like), each block 210 containing one or more data fields 215 (e.g., data fields #1-#20 contained in the five blocks 210a-210e depicted in FIG. 2) and/or one or more hash fields 220 (e.g., hash fields #1-#5 contained in the five blocks 210a-210e depicted in FIG. 2). For purposes of simplicity of illustration, only five blocks 210 are shown in the first instance 205 of the blockchain in FIG. 2, although the first instance 205 of the blockchain might comprise any suitable number of blocks 210. Although only four data fields 215 are shown in each block 210, the various embodiments are not so limited, and the first instance 205 of the blockchain might contain any suitable number of data fields 215.

The first block 210a in the first instance 205 of the blockchain might contain a first hash field #1 220 containing a hash value corresponding to the cryptographic hash of the collective data contained in data fields #1-#4 215 of the first block 210a. The second block 210b in the first instance 205 of the blockchain might contain a first hash field #1 220 (i.e., a preceding or previous hash field, or the like) containing the hash value corresponding to the cryptographic hash of the collective data contained in data fields #1-#4 215 of the first block 210a and a second hash field #2 220 containing a hash value corresponding to the cryptographic hash of the hash value contained in the first hash field #1 220 and the collective data contained in data fields #5-#8 215 of the second block 210b. The third block 210c in the first instance 205 of the blockchain might contain a second hash field #2 220 (i.e., a preceding or previous hash field, or the like) containing the hash value corresponding to the cryptographic hash of the hash value contained in the first hash field #1 220 and the collective data contained in data fields #5-#8 215 of the second block 210b and a third hash field #3 220 containing a hash value corresponding to the cryptographic hash of the hash value contained in the second hash field #2 220 and the collective data contained in data fields #9-#12 215 of the third block 210c. The fourth block 210d in the first instance 205 of the blockchain might contain a third hash field #3 220 (i.e., a preceding or previous hash field, or the like) containing the hash value corresponding to the cryptographic hash of the hash value contained in the second hash field #2 220 and the collective data contained in data fields #9-#12 215 of the third block 210c and a fourth hash field #4 220 containing a hash value corresponding to the cryptographic hash of the hash value contained in the third hash field #3 220 and the collective data contained in data fields #13-#16 215 of the fourth block 210d. The fifth block 210e in the first instance 205 of the blockchain might contain a fourth hash field #4 220 (i.e., a preceding or previous hash field, or the like) containing the hash value corresponding to the cryptographic hash of the hash value contained in the fourth hash field #4 220 and the collective data contained in data fields #13-#16 215 of the fourth block 210d and a fifth hash field #5 220 containing a hash value corresponding to the cryptographic hash of the hash value contained in the fourth hash field #4 220 and the collective data contained in data fields #17-#20 215 of the fifth block 210e.

Similar to the description above with respect to FIG. 1, a second instance 225 of the blockchain might be generated that contains only the hash values of each corresponding blocks 210a-210e of the first instance 205 of the blockchain, without containing the data contained in each block 210 of the first instance 205 of the blockchain. As shown in FIG. 2, the second instance 225 of the blockchain might comprise a plurality of blocks 230a-230e (collectively, "blocks 230" or the like), each block 230 containing one or more null fields 235 (e.g., fields contained in the five blocks 230a-230e depicted in FIG. 2) and/or one or more hash fields 240 (e.g., hash fields #1-#5 contained in the five blocks 230a-230e depicted in FIG. 2). Here, the null fields 235 do not contain any data contained in the blocks 210 of the first instance 205 of the blockchain. The hash fields 240 comprise hash fields #1-#5 240, where the hash field #1 240 containing the hash value contained in hash field #1 220, the hash field #2 240 containing the hash value contained in hash field #2 220, the hash field #3 240 containing the hash value contained in hash field #3 220, the hash field #4 240 containing the hash value contained in hash field #4 220, the hash field #5 240 containing the hash value contained in hash field #5 220, and so on.

Also, like the description above with respect to FIG. 1, one or more off-chain files 245 might comprise a plurality of files 250a-250e (collectively, "files 250" or the like), each block 250 containing one or more data fields 255 (e.g., data fields #1-#20 contained in the five files 250a-250e depicted in FIG. 2) and/or one or more hash fields 260 (e.g., hash fields #1-#5 contained in the five files 250a-250e depicted in FIG. 2). The data fields #1-#20 255 might contain the data contained in (and extracted from) data fields #1-#20 215, where data field #1 255 contains the data contained in (and extracted from) data field #1 215, data field #2 255 contains the data contained in (and extracted from) data field #2 215, data field #3 255 contains the data contained in (and extracted from) data field #3 215, and so on. Likewise, the hash fields #1-#5 260 might contain the hash values contained in (and extracted from) hash fields #1-#5 220, where hash field #1 260 contains the hash value contained in (and extracted from) hash field #1 220, hash field #2 260 contains the hash value contained in (and extracted from) hash field #2 220, hash field #3 260 contains the hash value contained in (and extracted from) hash field #3 220, and so on.

For purposes of simplicity of illustration, only five files 250 are shown in the off-chain files 245 in FIG. 2, although the off-chain files 245 might comprise any suitable number of files 250, so long as the manner in which the data contained in data fields #1-#20 215 of the first instance 205 of the blockchain is organized is mirrored in the data fields #1-#20 255 of the one or more files 250. Although only four data fields 255 are contained in each file 250, the various embodiments are not so limited, and the off-chain files 245 or the files 250 might contain any suitable number of data fields 255.

The second instance 225 of the blockchain might be stored in a distributed peer data storage system (e.g., peer data storage system 140 of the blockchain system 125 of FIG. 1, or the like). The off-chain files 245 might be stored in a secure database (e.g., secure database(s) 155 of the first party 145 of FIG. 1, or the like).

Although not shown, each block 210 of first instance 205 or each block 230 of second instance 225 might also contain other data or fields, including, but not limited to, block number fields, nonce field, data and/or time stamp fields, flag fields, and/or the like.

Figure 3:
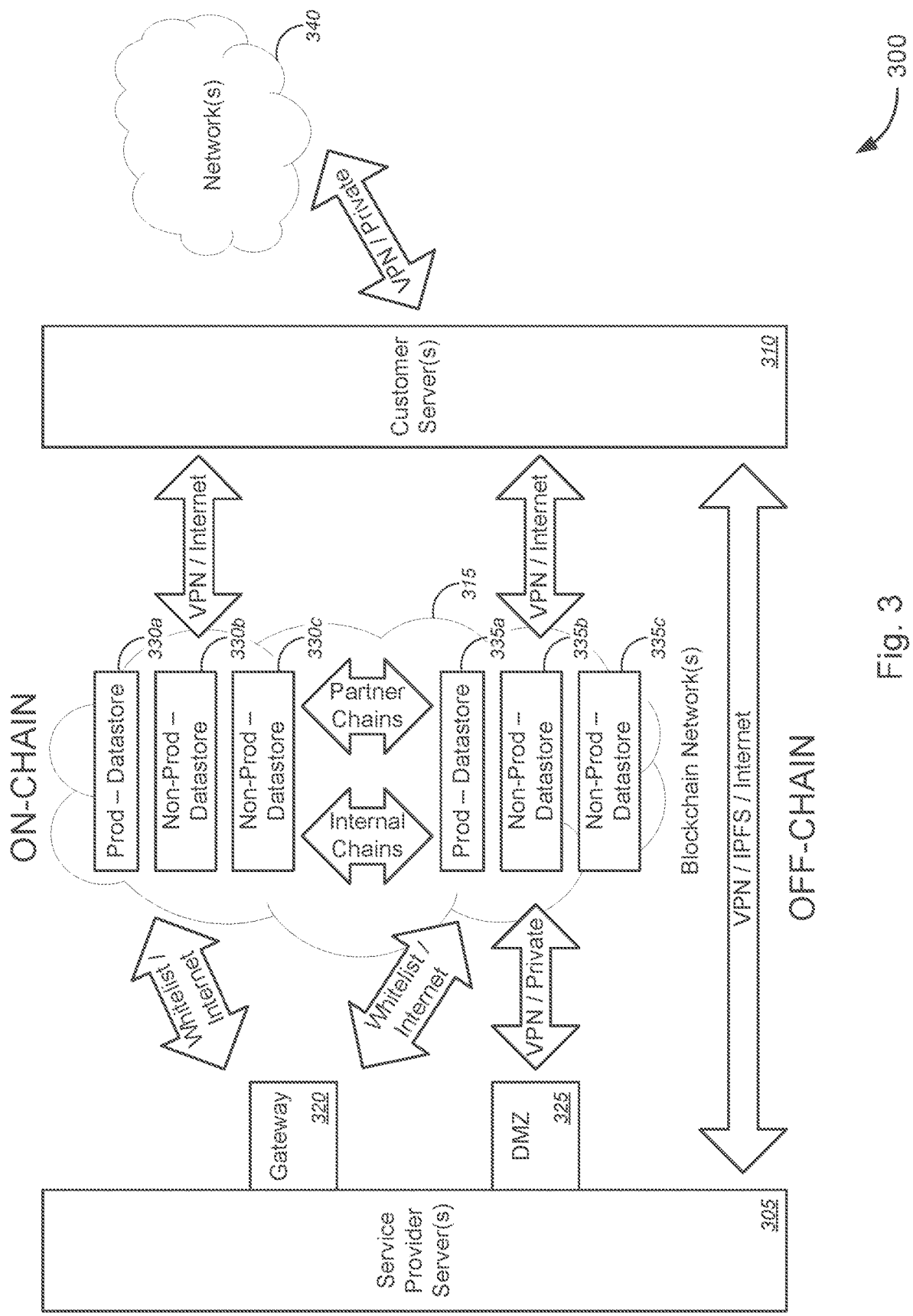
FIG. 3 is a schematic diagram illustrating another system for implementing off-chain functionality for data contained in blocks of blockchain, in accordance with various embodiments.

FIG. 3 is a schematic diagram illustrating another system 300 for implementing off-chain functionality for data contained in blocks of blockchain, in accordance with various embodiments.

In the non-limiting embodiment of FIG. 3, system 300 might comprise service provider server(s) 305 (similar to computing system 105 of FIG. 1, or the like), customer server(s) 310 (similar to local computing system 150 of FIG. 1, or the like), blockchain network(s) 315 (similar to network(s) 135 of FIG. 1, or the like), gateway 320, demilitarized zone ("DMZ") 325, one or more first datastores 330a-330c (collectively, "first datastores 330" or "datastores 330" or the like), one or more second datastores 335a-335c (collectively, "second datastores 335" or "datastores 335" or the like), and one or more networks 340.

Under on-chain blockchain conditions, a service provider server(s) 305 might access a first instance of a blockchain from one of the datastores 330a-330c in blockchain network(s) 315 or from one of the datastores 335a-335c in blockchain network(s) 315 via gateway 320 (which is either part of service provider server(s) 305 or communicatively coupled to service provider server(s) 305) and via whitelist or Internet connections (depicted in FIG. 3 by double-headed arrows denoted, "Whitelist/Internet"). In some cases, one or more instances of one or more blockchains might be exchanged between datastores 330 and datastores 335 in blockchain network(s) 315 via either partner chain connections (depicted in FIG. 3 by double-headed arrows denoted, "Partner Chains") or internal chain connections (depicted in FIG. 3 by double-headed arrows denoted, "Internal Chains"). Similarly, customer server(s) 310 might access the first instance of a blockchain from one of the datastores 330a-330c in blockchain network(s) 315 or from one of the datastores 335a-335c in blockchain network(s) 315 via virtual private network ("VPN") or Internet connections (depicted in FIG. 3 by double-headed arrows denoted, "VPN/Internet").

Although the above-mentioned connections are associated with authenticated or trusted communications or connections, certain communications or connections are less trustworthy. In such situations, DMZ 325 (which might either be part of service provider server(s) 305 or communicatively coupled to service provider server(s) 305) might be used to access the second datastores 335 via VPN or private connections (depicted in FIG. 3 by double-headed arrows, denotes, "VPN/Private"). Likewise, the customer server(s) 310 might communicatively couple with cloud network(s) 340 via a VPN or private connections (depicted in FIG. 3 by double-headed arrows, denotes, "VPN/Private"). Similar to typical network DMZ's, DMZ 325 might be used to expose an organization's (in this case, a service provider associated with service provider server(s) 305, or the like) external-facing services to untrusted networks.

In accordance with the embodiments as described above with respect to FIGS. 1 and 2, off-chain files (e.g., off-chain files 245 of FIG. 2, or the like)—which might be generated to enable off-chain functionalities including, but not limited to, at least one of content search functionality, content sorting functionality, or content filtering functionality, and/or the like, which functionalities are not possible with data contained in blocks of typical or conventional blockchains—might be exchanged between service provider server(s) 305 and customer server(s) 310 via VPN, InterPlanetary File System ("IPFS"), or Internet connections (depicted in FIG. 3 by double-headed arrows denoted, "VPN/IPFS/Internet"). In some cases, a computing system (e.g., computing system 105 of FIG. 1, or the like) of the service provider server(s) might generate the off-chain files by extracting the blocks from blockchains and by extracting the data (and the hash values) from the extracted blocks.

These and other functionalities of the embodiments of FIG. 3 might be implemented using the features of system 100 of FIG. 1.

FIGS. 4A-4D (collectively, "FIG. 4") are flow diagrams illustrating a method for implementing off-chain functionality for data contained in blocks of blockchain, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, and 300 of FIGS. 1, 2, and 3, respectively (or components thereof), such methods may also be implemented using any suitable hardware (or software) implementation. Similarly, while each of the systems, examples, or embodiments 100, 200, and 300 of FIGS. 1, 2, and 3, respectively (or components thereof), can operate according to the method 400 illustrated by FIG. 4 (e.g., by executing instructions embodied on a computer readable medium), the systems, examples, or embodiments 100, 200, and 300 of FIGS. 1, 2, and 3 can each also operate according to other modes of operation and/or perform other suitable procedures.

Figure 4A:
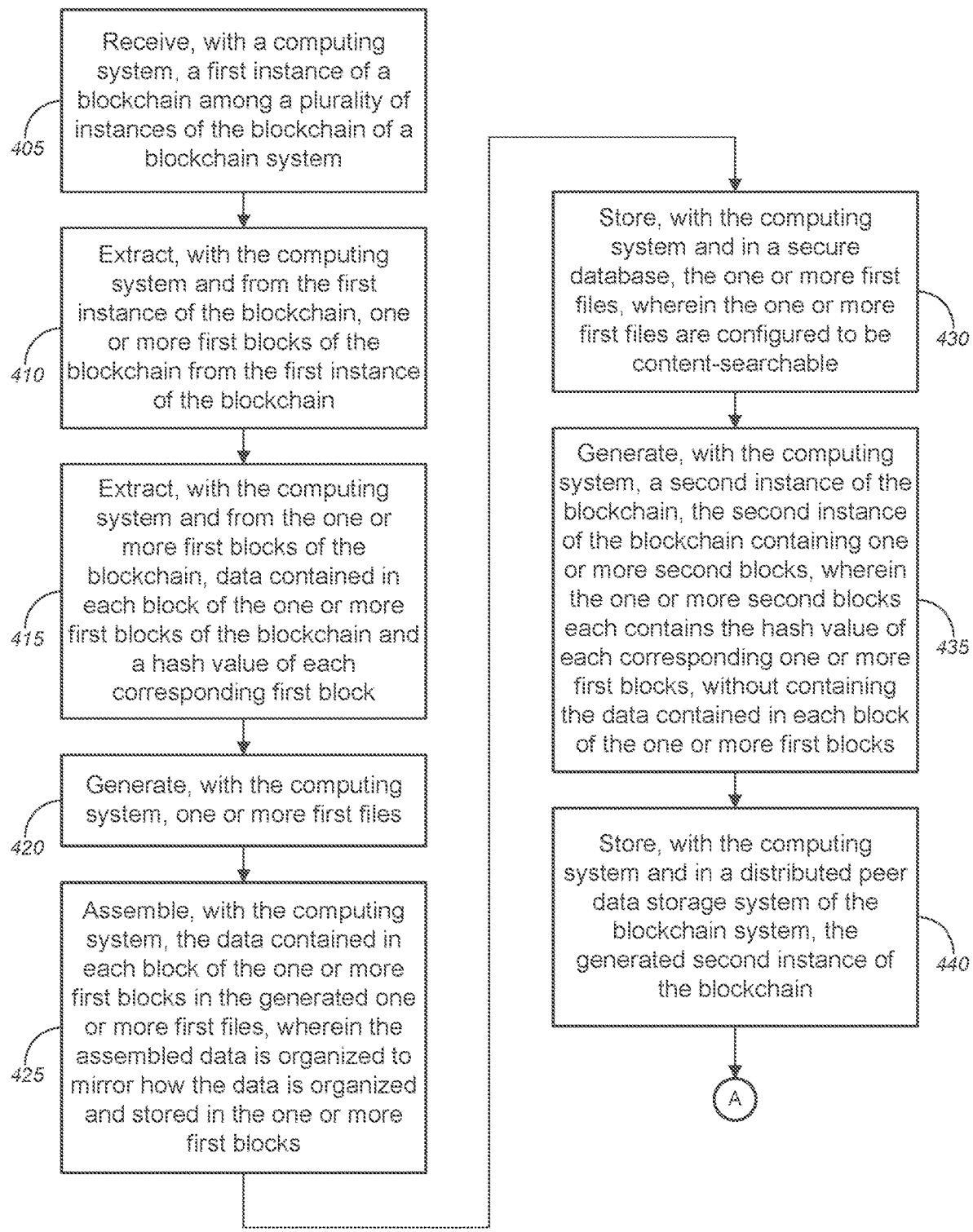
FIGS. 4A-4D are flow diagrams illustrating a method for implementing off-chain functionality for data contained in blocks of blockchain, in accordance with various embodiments.

In the non-limiting embodiment of FIG. 4A, method 400, at block 405, might comprise receiving, with a computing system, a first instance of a blockchain among a plurality of instances of the blockchain of a blockchain system. Method 400 might further comprise extracting, with the computing system and from the first instance of the blockchain, one or more first blocks of the blockchain from the first instance of the blockchain (block 410), and extracting, with the computing system and from the one or more first blocks of the blockchain, data contained in each block of the one or more first blocks of the blockchain and a hash value of each corresponding first block (block 415). At block 420, method 400 might comprise generating, with the computing system, one or more first files.

According to some embodiments, the computing system might include, without limitation, one of a data management system, a server computer, a cloud-based computing system over a network, or a distributed computing system, and/or the like. In some cases, the hash value of each corresponding first block might be produced using a cryptographic hash function including, but not limited to, one of secure hash algorithm-1 ("SHA-1") standard, SHA-2 standard, or SHA-3 standard, and/or the like.

Method 400 might further comprise, at block 425, assembling, with the computing system, the data contained in each block of the one or more first blocks in the generated one or more first files, wherein the assembled data is organized to mirror how the data is organized and stored in the one or more first blocks. Method 400, at block 430, might comprise storing, with the computing system and in a secure database, the one or more first files, wherein the one or more first files are configured to be content-searchable.

In some embodiments, the secure database might be associated with a first company, and the secure database might be disposed within an internal network of the first company and the secure database might be insulated from external networks via a firewall. In some instances, the one or more first files might include, without limitation, one or more data management system files that enable database search functionality including, but not limited to, at least one of content search functionality, content sorting functionality, or content filtering functionality, and/or the like.

Method 400 might further comprise generating, with the computing system, a second instance of the blockchain, the second instance of the blockchain containing one or more second blocks, wherein the one or more second blocks each contains the hash value of each corresponding one or more first blocks, without containing the data contained in each block of the one or more first blocks (block 435). At block 440, method 400 might comprise storing, with the computing system and in a distributed peer data storage system of the blockchain system, the generated second instance of the blockchain. Method 400 might continue onto the process at optional block 445 in FIG. 4B following the circular marker denoted, "A."

Figure 4B:
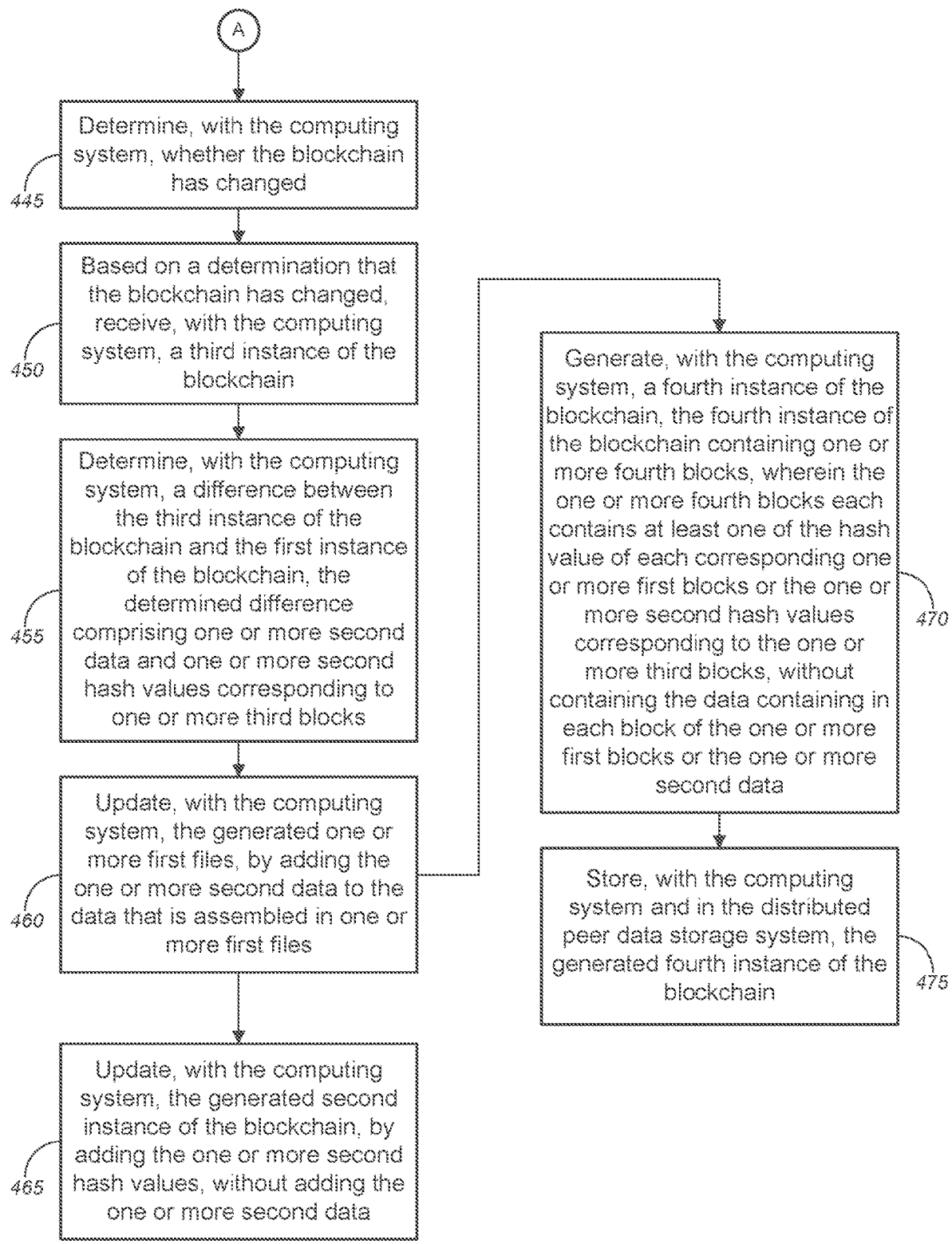

At block 445 in FIG. 4B (following the circular marker denoted, "A"), method 400 might comprise determining, with the computing system, whether the blockchain has changed. Method 400 might further comprise, based on a determination that the blockchain has changed, receiving, with the computing system, a third instance of the blockchain (block 450). Method 400, at block 455, might comprise determining, with the computing system, a difference between the third instance of the blockchain and the first instance of the blockchain, the determined difference comprising one or more second data and one or more second hash values corresponding to one or more third blocks. Method 400 might further comprise, at block 460, updating, with the computing system, the generated one or more first files, by adding the one or more second data to the data that is assembled in one or more first files.

In some embodiments, method 400 might further comprise updating, with the computing system, the generated second instance of the blockchain, by adding the one or more second hash values, without adding the one or more second data (block 465). Alternatively, method 400 might further comprise generating, with the computing system, a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data (block 470); and storing, with the computing system and in the distributed peer data storage system, the generated fourth instance of the blockchain (block 475).

Figure 4C:
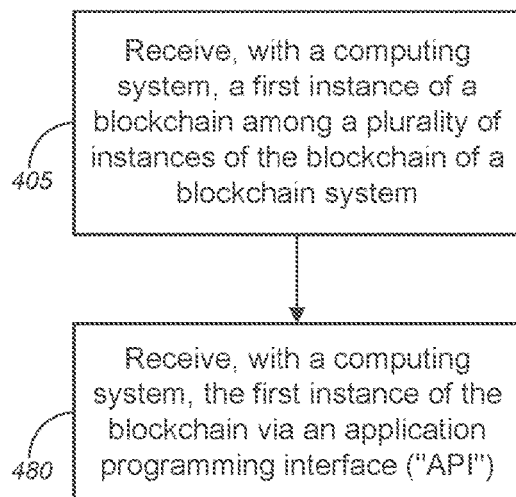

With reference to FIG. 4C, receiving the first instance of the blockchain (at block 405) might comprise receiving, with the computing system, the first instance of the blockchain via an application programming interface ("API") (block 480).

Figure 4D:
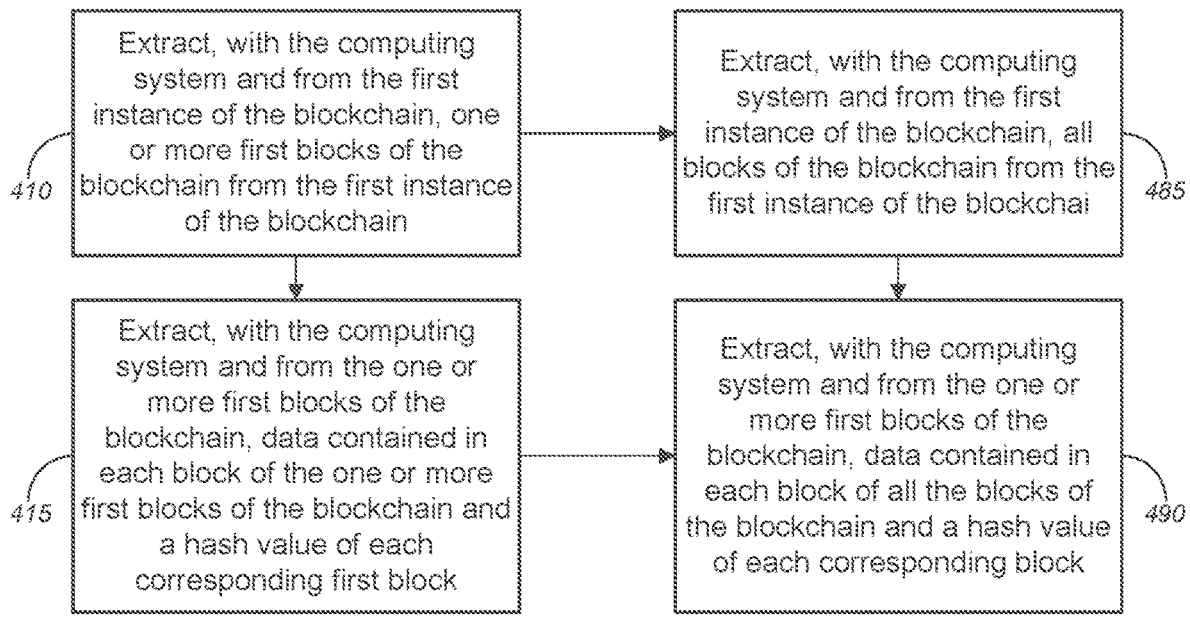

Referring to FIG. 4D, extracting the one or more first blocks of the blockchain from the first instance of the blockchain (at block 410) might comprise extracting, with the computing system and from the first instance of the blockchain, all blocks of the blockchain from the first instance of the blockchain (block 485), and extracting the data and the hash value from each block (at block 415) might comprise extracting, with the computing system and from the one or more first blocks of the blockchain, data contained in each block of all the blocks of the blockchain and a hash value of each corresponding block (block 490).

Exemplary System and Hardware Implementation

Figure 5:
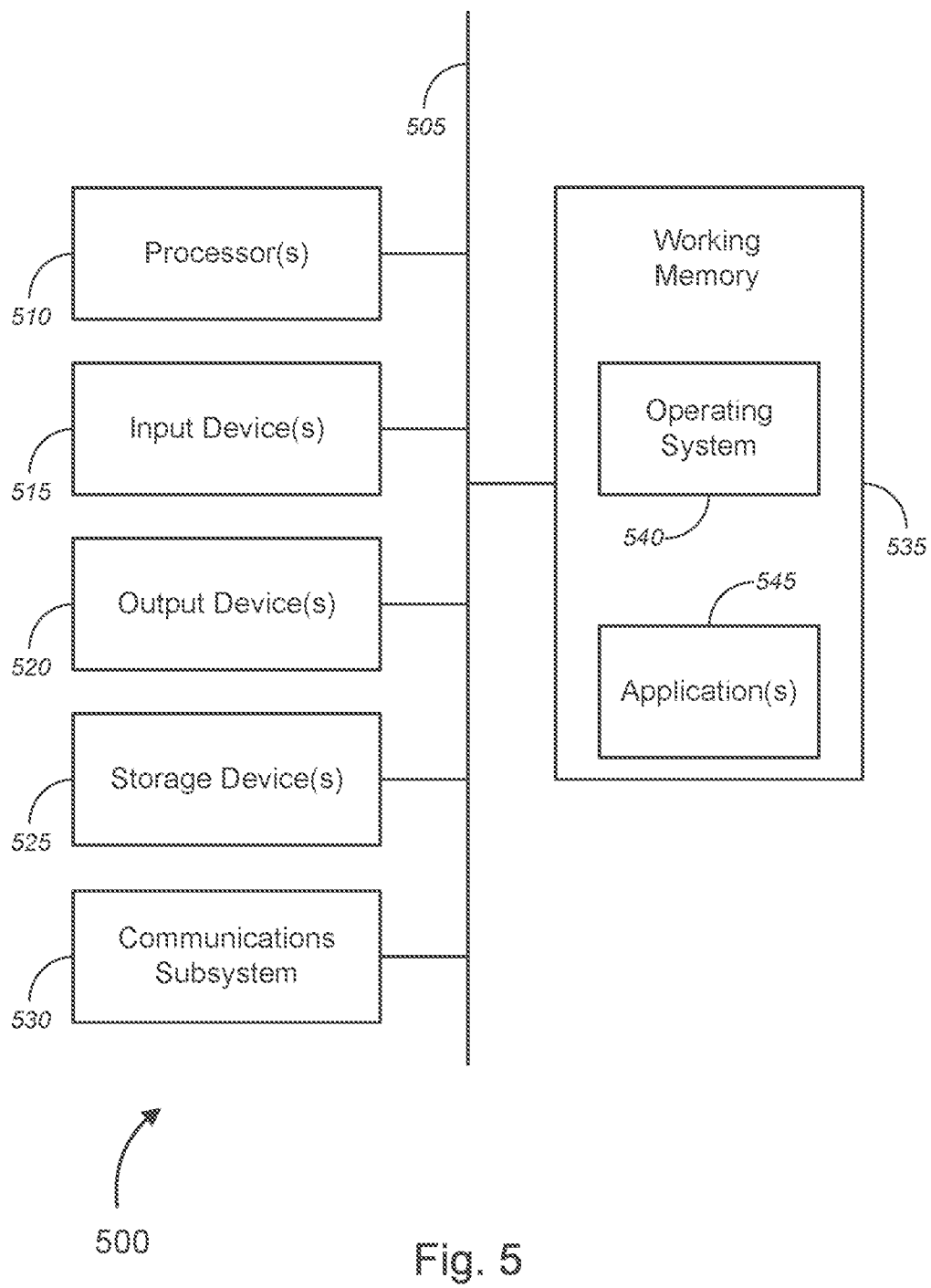
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system(s) 105, client devices 115a-115n, blockchain system 125, blockchain computing system 130, local computing system 150, service provider server(s) 305, customer server(s) 310, and gateway 320, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105, client devices 115a-115n, blockchain system 125, blockchain computing system 130, local computing system 150, service provider server(s) 305, customer server(s) 310, and gateway 320, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
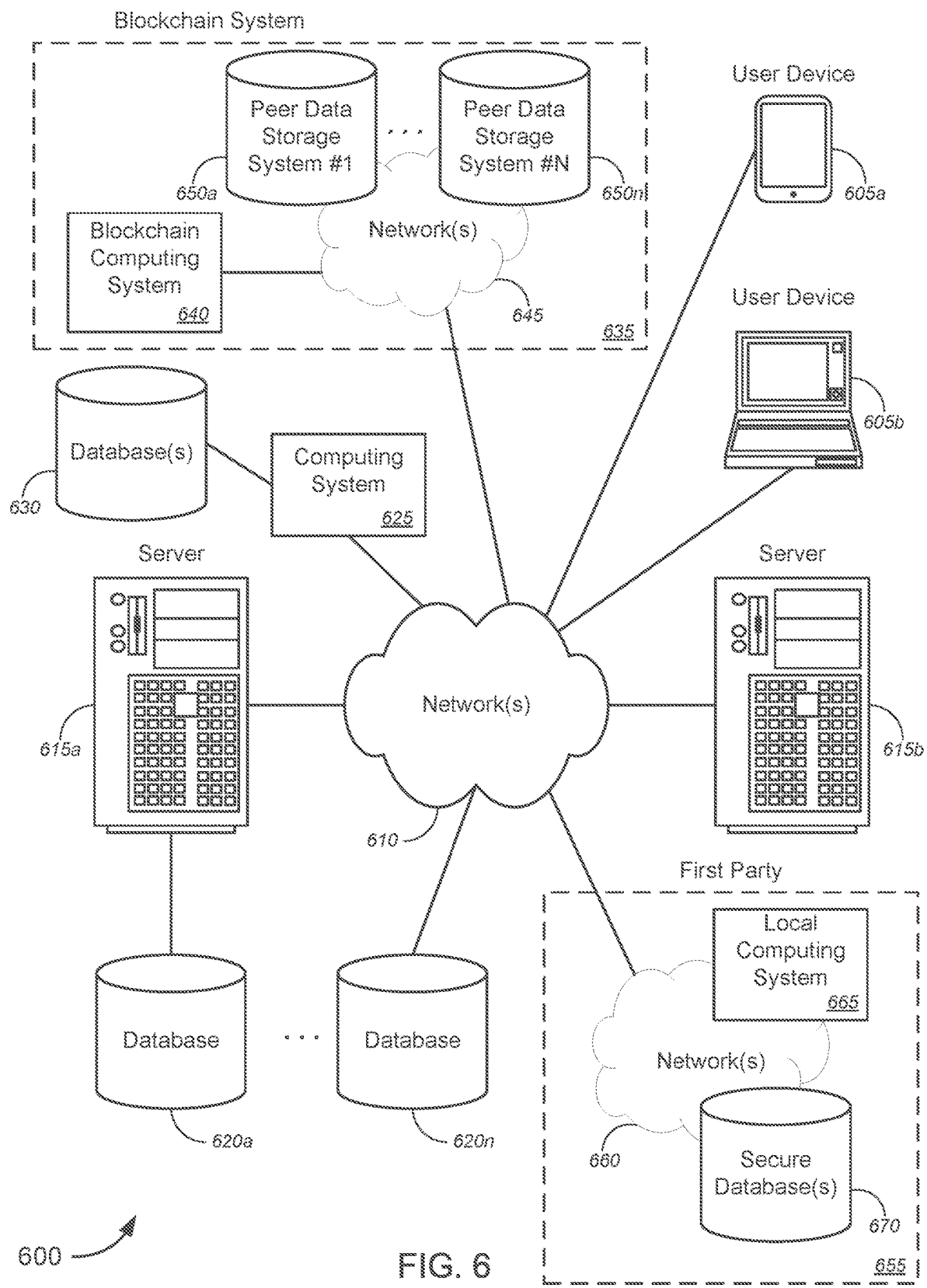
FIG. 6 is a block diagram illustrating a networked system of computers, computing systems, or system hardware architecture, which can be used in accordance with various embodiments.

As noted above, a set of embodiments comprises methods and systems for implementing blockchain functionality, and, more particularly, to methods, systems, and apparatuses for implementing off-chain functionality for data contained in blocks of blockchain. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 610 (similar to network(s) 120, 135, or 160 of FIG. 1 or blockchain network(s) 315 or 340 of FIG. 3, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615. Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing blockchain functionality, and, more particularly, to methods, systems, and apparatuses for implementing off-chain functionality for data contained in blocks of blockchain, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing system(s) 105 or service provider server(s) 305 of FIGS. 1 and 3, or the like) and corresponding database(s) 630 (similar to database(s) 110 of FIG. 1, or the like). System 600 might further comprise blockchain system 635 (similar to blockchain system 125 of FIG. 1, or the like), which might comprise blockchain computing system 640 (similar to blockchain computing system 130 of FIG. 1, or the like), one or more network(s) 645 (similar to network(s) 135 or 315 of FIG. 1 or 3, or the like), and one or more peer data storage systems #1-#N 650a-650n (similar to peer data storage systems 140a-140n or datastores 330a-330c or 335a-335c of FIG. 1 or 3, or the like). System 600 might further comprise first party 655 (similar to first party 145 or customer associated with customer server(s) 310 of FIG. 1 or 3, or the like), which might comprise or might be associated with network(s) 660 (similar to network(s) 160 of FIG. 1, or the like), a local computing system 665 (similar to local computing system 150 or customer server(s) 310 of FIG. 1 or 3, or the like), and secure database(s) 670 (similar to secure database(s) 155 of FIG. 1, or the like).

In operation, the computing system(s) 625 (and/or the local computing system 665, or the like) might receive (e.g., from blockchain system 635, or one or more of the peer data storage systems 650, or the like) a first instance of a blockchain among a plurality of instances of the blockchain of blockchain system 635; might extract, from the first instance of the blockchain, one or more first blocks of the blockchain from the first instance of the blockchain; might extract, from the one or more first blocks of the blockchain, data contained in each block of the one or more first blocks of the blockchain and a hash value of each corresponding first block; and might generate one or more first files. The computing system(s) 625 (and/or the local computing system 665, or the like) might assemble the data contained in each block of the one or more first blocks in the generated one or more first files, wherein the assembled data is organized to mirror how the data is organized and stored in the one or more first blocks; might store, in a secure database (e.g., secure database(s) 670, or the like), the one or more first files (as shown, e.g., in FIG. 2, or the like), wherein the one or more first files are configured to be content-searchable; might generate a second instance of the blockchain, the second instance of the blockchain containing one or more second blocks, wherein the one or more second blocks each contains the hash value of each corresponding one or more first blocks, without containing the data contained in each block of the one or more first blocks (as shown, e.g., in FIG. 2, or the like); and might store, in a distributed peer data storage system (e.g., peer data storage system 650, or the like) of the blockchain system 635, the generated second instance of the blockchain.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
receiving, with a computing system, a first instance of a blockchain of a blockchain system;

extracting, with the computing system and from the first instance of the blockchain, one or more first blocks of the blockchain from the first instance of the blockchain;

extracting, with the computing system and from the one or more first blocks of the blockchain, data contained in each block of the one or more first blocks of the blockchain and a hash value of each corresponding first block;

generating, with the computing system, one or more first files;

assembling, with the computing system, the data contained in each block of the one or more first blocks in the generated one or more first files, wherein the assembled data is organized to mirror how the data is organized and stored in the one or more first blocks;

storing, with the computing system and in a secure database, the one or more first files, wherein the one or more first files are configured to be content-searchable;

generating, with the computing system, a second instance of the blockchain, the second instance of the blockchain containing one or more second blocks, wherein the one or more second blocks each contains the hash value of each corresponding one or more first blocks, without containing the data contained in each block of the one or more first blocks; and storing, with the computing system and in a distributed peer data storage system of the blockchain system, the generated second instance of the blockchain.

2. The method of claim 1, wherein the computing system comprises one of a data management system, a server computer, a cloud-based computing system over a network, or a distributed computing system.

3. The method of claim 1, wherein the secure database is associated with a first company, and the secure database is disposed within an internal network of the first company and the secure database is insulated from external networks via a firewall.

4. The method of claim 1, wherein the hash value of each corresponding first block is produced using a cryptographic hash function comprising one of secure hash algorithm-1 ("SHA-1") standard, SHA-2 standard, or SHA-3 standard.

5. The method of claim 1, wherein the one or more first files comprise one or more data management system files that enable database search functionality comprising at least one of content search functionality, content sorting functionality, or content filtering functionality.

6. The method of claim 1, wherein extracting the one or more first blocks of the blockchain from the first instance of the blockchain comprises extracting all blocks of the blockchain from the first instance of the blockchain, wherein extracting the data and the hash value from each block comprises extracting data contained in each block of all the blocks of the blockchain and a hash value of each corresponding block.

7. The method of claim 1, wherein receiving the first instance of the blockchain comprises receiving, with the computing system, the first instance of the blockchain via an application programming interface ("API").

8. The method of claim 1, further comprising:

determining, with the computing system, whether the blockchain has changed;

based on a determination that the blockchain has changed, receiving, with the computing system, a third instance of the blockchain;

determining, with the computing system, a difference between the third instance of the blockchain and the first instance of the blockchain, the determined difference comprising one or more second data and one or more second hash values corresponding to one or more third blocks;

updating, with the computing system, the generated one or more first files, by adding the one or more second data to the data that is assembled in one or more first files;

generating, with the computing system, a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and storing, with the computing system and in the distributed peer data storage system, the generated fourth instance of the blockchain.

9. The method of claim 8, wherein generating the fourth instance of the blockchain and storing the generated fourth instance of the blockchain comprises updating, with the computing system, the generated second instance of the blockchain, by adding the one or more second hash values, without adding the one or more second data.

10. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive a first instance of a blockchain of a blockchain system;

extract, from the first instance of the blockchain, one or more first blocks of the blockchain from the first instance of the blockchain;

extract, from the one or more first blocks of the blockchain, data contained in each block of the one or more first blocks of the blockchain and a hash value of each corresponding first block;

generate one or more first files;

assemble the data contained in each block of the one or more first blocks in the generated one or more first files, wherein the assembled data is organized to mirror how the data is organized and stored in the one or more first blocks;

store, in a secure database, the one or more first files, wherein the one or more first files are configured to be content-searchable;

generate a second instance of the blockchain, the second instance of the blockchain containing one or more second blocks, wherein the one or more second blocks each contains the hash value of each corresponding one or more first blocks, without containing the data contained in each block of the one or more first blocks; and store, in a distributed peer data storage system of the blockchain system, the generated second instance of the blockchain.

11. The system of claim 10, wherein the computing system comprises one of a data management system, a server computer, a cloud-based computing system over a network, or a distributed computing system.

12. The system of claim 10, wherein the secure database is associated with a first company, and the secure database is disposed within an internal network of the first company and the secure database is insulated from external networks via a firewall.

13. The system of claim 10, wherein the hash value of each corresponding first block is produced using a cryptographic hash function comprising one of secure hash algorithm-1 ("SHA-1") standard, SHA-2 standard, or SHA-3 standard.

14. The system of claim 10, wherein the one or more first files comprise one or more data management system files that enable database search functionality comprising at least one of content search functionality, content sorting functionality, or content filtering functionality.

15. The system of claim 10, wherein extracting the one or more first blocks of the blockchain from the first instance of the blockchain comprises extracting all blocks of the blockchain from the first instance of the blockchain, wherein extracting the data and the hash value from each block comprises extracting data contained in each block of all the blocks of the blockchain and a hash value of each corresponding block.

16. The system of claim 10, wherein receiving the first instance of the blockchain comprises receiving the first instance of the blockchain via an application programming interface ("API").

17. The system of claim 10, wherein the first set of instructions, when executed by the at least one first processor, further causes the computing system to:
    determine whether the blockchain has changed;
    based on a determination that the blockchain has changed, receive a third instance of the blockchain;
    determine a difference between the third instance of the blockchain and the first instance of the blockchain, the determined difference comprising one or more second data and one or more second hash values corresponding to one or more third blocks;
    update the generated one or more first files, by adding the one or more second data to the data that is assembled in one or more first files;
    generate a fourth instance of the blockchain, the fourth instance of the blockchain containing one or more fourth blocks, wherein the one or more fourth blocks each contains at least one of the hash value of each corresponding one or more first blocks or the one or more second hash values corresponding to the one or more third blocks, without containing the data containing in each block of the one or more first blocks or the one or more second data; and
    store, in the distributed peer data storage system, the generated fourth instance of the blockchain.

18. The system of claim 17, wherein generating the fourth instance of the blockchain and storing the generated fourth instance of the blockchain comprises updating the generated second instance of the blockchain, by adding the one or more second hash values, without adding the one or more second data.

* * * * *